Feb. 13, 1962  A. G. DEAN  3,020,857
CAR BODY AND TRUCK ASSEMBLY WITH TRUCK BOLSTER STABILIZING MEANS
Filed Oct. 19, 1960
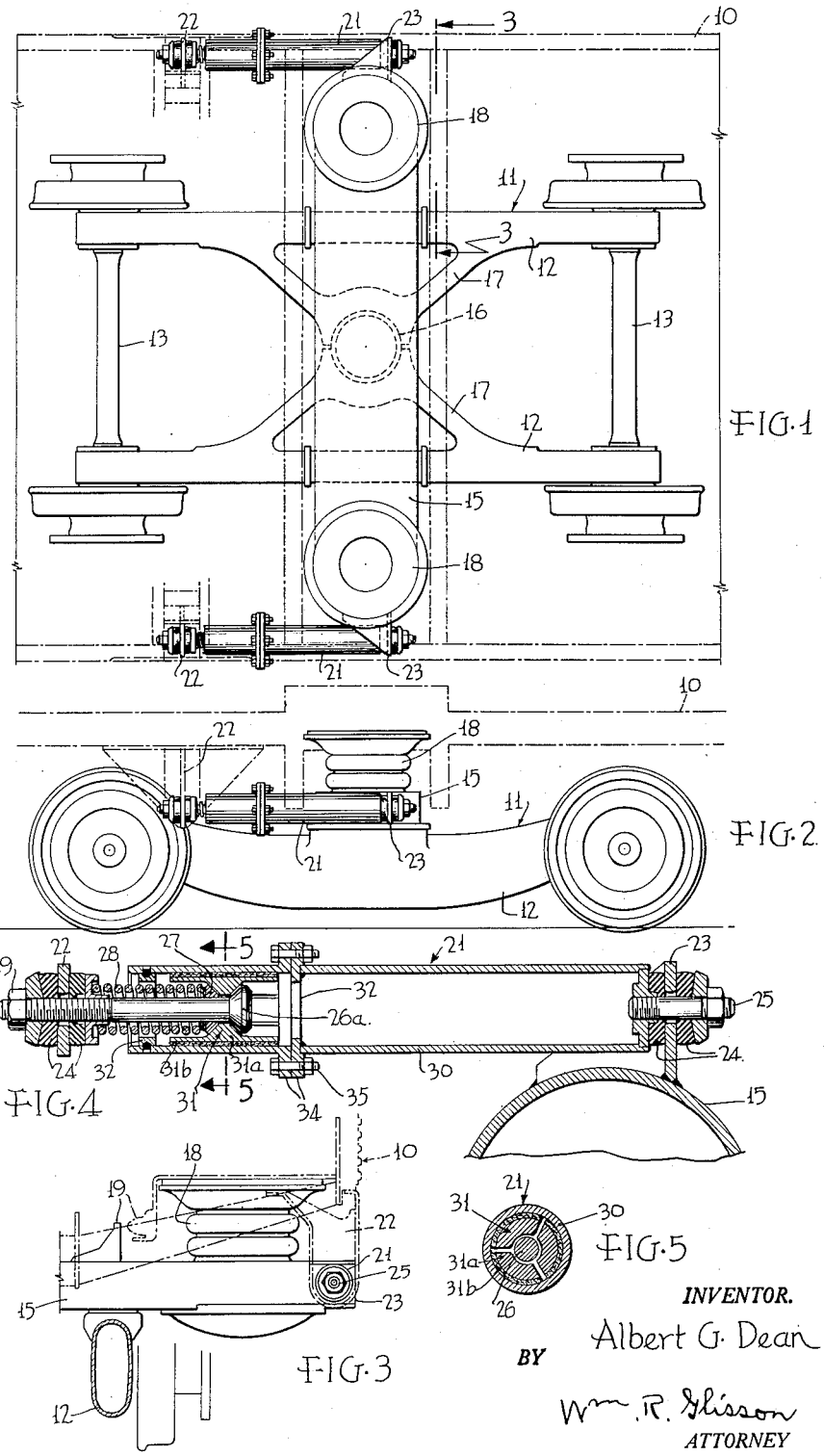
INVENTOR.
Albert G. Dean
BY
Wm. R. Glisson
ATTORNEY United States Patent Office 3,020,857
Patented Feb. 13, 1962

3,020,857
CAR BODY AND TRUCK ASSEMBLY WITH TRUCK BOLSTER STABILIZING MEANS
Albert G. Dean, Narberth, Pa., assignor to The Budd Company, Philadelphia, Pa., a corporation of Pennsylvania
Filed Oct. 19, 1960, Ser. No. 63,538
4 Claims. (Cl. 105—199)

This invention relates to a car body and truck assembly with truck bolster stabilizing means and has for an object the provision of improvements in this art.

The invention is particularly applicable to trucks having vertical springs, such as air bellows or coil springs or both, which permit lateral movement, i.e., horizontal movement, between the supported and supporting parts with the springs providing a restoring force toward a vertical medial position, and having stay rods for limiting the lateral movement in one or more directions.

As one application, the invention may be applied to the truck shown in Patent No. 2,908,230 granted to Walter B. Dean. In that patent a bolster carries vertical air springs at its ends which directly support a car body and longitudinal stay bars which resiliently connect the bolster ends to the car body to limit relative longitudinal movement therebetween. This bolster is referred to herein as a truck bolster because it is dealt with as a part of the truck assembly but since it is essentially carried by the body and has no turning movement with the body but rather has turning movement with the truck parts therebelow, it is at times referred to as a body bolster.

Such trucks are subject to various oscillatory forces, such as the longitudinal oscillations due to spaced staggered rail joints, which transmit objectionable disturbances to the car body and passengers therein. These disturbances are particularly objectionable when their frequency corresponds to the natural frequency of the longitudinal anchorages or stay bars with their resilient end mountings. The usual procedure in dealing with these longitudinal disturbances has been to adjust the tension on the stay bars to such a point that the most troublesome disturbances have been relieved but this procedure has not been satisfactory because such tensioning tunes to the frequency of a given speed and does not accommodate for other speeds and may, in fact, increase the disturbances at speeds other than the one for which the tension adjustment was made.

According to the present invention there is interposed in the stay bars a means to provide damped free slack of considerable amplitude with stops provided either in the stay bars or at some other convenient location to prevent excessive movement in the case of unusually heavy accelerations or impacts. Inherent resilience of the vertical springs will re-center the system when the disturbing force is removed, ready for the next action, and normally the limit stops which are provided will not be called into action. This will be true for the accelerating forces of power-driven trucks and the decelerating forces of braking.

The invention will be better understood by reference to a specific embodiment shown in the accompanying drawings, wherein:

FIG. 1 is a top plan view of a truck embodying the invention;

FIG. 2 is a side elevation;

FIG. 3 is a partial transverse vertical section and elevation taken on the line 3—3 of FIG. 1;

FIG. 4 is an enlarged longitudinal section and elevation of a stay bar alone; and FIG. 5 is a transverse section taken on the line 5—5 of FIG. 4.

As shown in the drawings, a car body or body unit 10, shown in phantom, is supported on a truck 11 having side frames 12 carrying wheel-axle units 13. The truck also includes a transverse bolster 15 resting near its ends on slide pads on the side frames and turnable with the body relative to the lower part of the truck about a center joint 16 with inward extensions 17 of the side frames.

The bolster supports the car body through vertical springs 18, such as air bellows, and lateral movement between the car body and bolster is taken by shock absorbers (not shown) and resilient stops 19.

Longitudinal movements between the bolster and car body are taken by stay bars 21 secured between projections 22 and 23 carried respectively by the car body and bolster. Elastic washers or doughnuts 24 are secured between the projections 22, 23 and clamping means or rods 25, 26 carried by the ends of the stay bars.

The stay bars are formed as friction shock absorbers, here shown as the Houdaille type, having a barrel 30 and a friction plunger 31 slidably mounted therein. The plunger is formed of shoe segments 31a carrying friction lining 31b. The shoes are spread for friction adjustment by the conical head 26a of the rod 26 and a conical washer 27. A spring 28 regulates the pressures acting on the friction linings and clamping pressure on the rubber washers 24 is adjusted by a nut 29 and a washer threaded on the rod 26.

Stops 32 are secured in the barrel to limit the movements of the plunger, though in action these end stops are not often needed since the usual longitudinal movements are too short.

In order to provide easy assembly the barrel is made in two parts with mating flanges 34 secured together by bolts 35, suitable packing being placed between the flanges.

In action the friction shock absorber stay bars permit some movement between the car body and bolster but frictionally resist the movement and thereby damp out uncomfortable oscillations which would otherwise be transmitted into the car body.

While one embodiment of the invention has been described for purposes of illustration it is to be understood that there may be various embodiments and modifications within the general scope of the invention.

What is claimed is:

1. A car body and truck assembly with truck bolster stabilizing means, comprising in combination with a car body unit and a truck frame unit turnably supporting the car body unit upon a bolster, together with vertical springs between the bolster and one of said units, of a longitudinal stay bar having turnable connections at its ends with an end of said bolster and with one of said units respectively, said stay bar including separate relatively longitudinally movable end parts and buffer means interposed therebetween which allows relative movement between the ends of the stay bar along the length thereof to reduce oscillatory movements between the parts connected to the ends of the stay bar.

2. A car body and truck assembly with truck bolster stabilizing means as set forth in claim 1, in which said buffer means comprises sliding friction means.

3. A car body and truck assembly with truck bolster stabilizing means, comprising in combination with a car body and a truck frame, a bolster turnably supported on the truck frame, and vertical springs supporting the car body on the ends of said bolster, of a longitudinal stay bar having resilient turnable connections with one end of said bolster and with said car body respectively, said stay bar including separate relatively longitudinally movable end parts and buffer means interposed therebetween which allows relative movement between the ends of the stay bar along the length thereof to reduce oscillatory movements between the bolster and the car body unit.

4. A car body and truck assembly with truck bolster stabilizing means as set forth in claim 3, in which said buffer means comprises slidable friction elements between said longitudinally movable end parts.

References Cited in the file of this patent

UNITED STATES PATENTS

| | | |
|---|---|---|
| 2,040,262 | Kruckenberg et al. | May 12, 1936 |
| 2,268,267 | Sheesley | Dec. 30, 1941 |
| 2,908,230 | Dean | Oct. 13, 1959 |